US008845990B2

(12) United States Patent
Germeau et al.

(10) Patent No.: US 8,845,990 B2
(45) Date of Patent: Sep. 30, 2014

(54) METHOD AND DEVICE FOR PRODUCING POLYPHOSPHORIC ACID

(75) Inventors: Alain Germeau, Auderghem (BE); Bernard Heptia, Wanze (BE)

(73) Assignee: Prayon Technologies, Engis (BE)

( * ) Notice: Subject to any disclaimer, the term of this patent is extended or adjusted under 35 U.S.C. 154(b) by 0 days.

(21) Appl. No.: 13/260,410

(22) PCT Filed: Mar. 25, 2010

(86) PCT No.: PCT/EP2010/053947
§ 371 (c)(1),
(2), (4) Date: Nov. 14, 2011

(87) PCT Pub. No.: WO2010/108991
PCT Pub. Date: Sep. 30, 2010

(65) Prior Publication Data
US 2012/0058038 A1    Mar. 8, 2012

(30) Foreign Application Priority Data

Mar. 26, 2009  (BE) .................................. 2009/0186

(51) Int. Cl.
*C01B 25/234* (2006.01)
*C01B 25/24* (2006.01)
*B01J 19/26* (2006.01)
*B01J 8/02* (2006.01)

(52) U.S. Cl.
CPC ...... *B01J 8/025* (2013.01); *B01J 19/26* (2013.01); *B01J 8/0278* (2013.01); *C01B 25/24* (2013.01)
USPC ........................................ 423/321.1; 423/317

(58) Field of Classification Search
CPC ................ C01B 25/18; C01B 25/22–25/222; C01B 25/02; B01J 10/00; B01J 19/26
USPC ................................................ 423/304–321.2
See application file for complete search history.

(56) References Cited

U.S. PATENT DOCUMENTS 2,611,681 A * 9/1952 Bellinger ...................... 423/317
(Continued)

FOREIGN PATENT DOCUMENTS

| FR | 1 399 421 | 5/1965 |
| GB | 1050813 | 12/1966 |
| WO | 03014017 | 2/2003 |

OTHER PUBLICATIONS

International Search Report of PCT/EP2010/053947, dated May 26, 2010, 2 pgs.

*Primary Examiner* — Stanley Silverman
*Assistant Examiner* — Justin Bova
(74) *Attorney, Agent, or Firm* — McCraken & Frank LLC

(57) ABSTRACT

A method and device for producing polyphosphoric acid burns a fuel in combustion air in a combustion chamber, sprays a spray fluid comprising substantially pure orthophosphoric acid and undertakes polymerization-condensation of the pure orthophosphoric acid. A polyphosphoric acid in the form of an acid mist accompanied by formation of gases which mix with combustion gases resulting from burning of the fuel is formed to reach a predetermined temperature, wherein the mixture causes sudden lowering of combustion gas temperature. The acid mix is separated from the gas mixture and the polyphosphoric acid is collected at a bottom of the combustion chamber and the gas mixture is outputted via a lower part of the combustion chamber separate from the collection of polyphosphoric acid.

16 Claims, 2 Drawing Sheets

(56) References Cited

U.S. PATENT DOCUMENTS

| | | | |
|---|---|---|---|
| 3,272,597 A * | 9/1966 | Klaus et al. | 422/612 |
| 3,403,974 A * | 10/1968 | Mustian, Jr. | 423/316 |
| 3,420,627 A * | 1/1969 | Young | 423/321.1 |
| 3,507,614 A * | 4/1970 | Achorn et al. | 423/316 |
| 3,526,482 A * | 9/1970 | Beltz et al. | 422/202 |
| 3,598,525 A * | 8/1971 | Harnisch et al. | 423/304 |

* cited by examiner

METHOD AND DEVICE FOR PRODUCING POLYPHOSPHORIC ACID

The present invention relates to a method for producing polyphosphoric acid from substantially pure solutions of orthophosphoric acid.

Polyphosphoric acid is an oligomer of phosphoric acid comprising molecules according to one or other of the structural formulas $$P_nO3_{n+1}^{(n+2)-}$$

wherein n is an integer greater than 1, or $$P_2O_5x(O^{2-})$$

wherein X lies between 0 and 1. Typically, polyphosphoric acid has a mean molecular weight of between 170 and 1500 atomic weight units.

Polyphosphoric acid is generally obtained by dehydration and polymerization of relatively pure orthophosphoric acid and is used in various applications such as petrochemistry, organic pigments and pharmaceuticals, chiefly in cyclization reactions, in addition to many others.

The polymerization reaction of phosphoric acid to polyphosphoric acid is also called a polymerization-condensation reaction since when the molecules of phosphoric acid join together to form the said oligomer, water is generated.

In the condensation reaction of phosphoric acid, it is necessary to add calories to enable this condensation. Calories can be added in different manners such as hot gases generated by burning fuel, electrodes allowing direct heating of the phosphoric acid solution in which they are immersed. In this case, the walls of the container of phosphoric acid act as the other electrode. Calories can also be provided by conduction through walls, such as the walls of the reactor for example.

As an example, U.S. Pat. No. 4,296,082 can be cited which proposes electrically heated graphite reactors, or patent EP 996587 which describes a process allowing the production of polyphosphoric acid by providing energy via micro-waves. Finally, patent EP 1421030 describes a packed column into which the acid, fed into the top end, circulates in counter-current flow with hot gases fed into the bottom end of the packed column.

Unfortunately, all these proposed methods and devices produce numerous pollutants and lay heavy stress on the equipment used.

At the current time, industrial units producing polyphosphoric acid from phosphoric acid by wet process are all faced with some problems such as high maintenance costs caused by phenomena of corrosion, excess emission of gaseous effluent into the environment and sharply rising energy prices since all these methods are major energy consumers whilst not always having high energy efficiency. The excessive emission of gaseous effluent into the environment is due inter alga to the fact that the phosphoric acid used contains some contaminants such as traces of sulphuric acid originating from sulphuric attack on the phosphate ore, and various fluorinated compounds in particular HF derived from the fluorine contained in this same phosphate ore. It is therefore one objective of the invention to propose a novel method providing the benefit of high energy efficiency, drastically limiting environmental impact, and providing a device which can withstand very severe operating conditions allowing limited maintenance costs and durability of equipment, and finally ensuring the production of quality phosphoric acid and hence designed to avoid contamination of the phosphoric acid during the manufacturing process.

To solve this problem, it was first necessary to find a material which could withstand service conditions in particular a temperature of about 650° C. which must be reached to produce the most concentrated qualities of polyphosphoric acid. For this purpose, three materials were selected subsequent to testing by conductive transfer conducted in an electric furnace proposed in the comparative Example. These are vitreous carbon, graphite coated with pyrolitic carbon and silicon carbide. Unfortunately, for technical reasons also mentioned in the comparative Example none of these three materials, carbon or silica-based, could be chosen.

Consequently, since it was not possible to use any material allowing energy transfer by conduction through the walls of apparatus or equipment made in one of these three materials, it was necessary to find other means for transferring to the phosphoric acid the energy needed for polymerization thereof. It was therefore imagined to effect heat transfer in a column using a hot gas circulating from bottom upwards in counter-current flow with the phosphoric acid fed into the top part. However this technique was not chosen since, although favourable from an energy viewpoint, it is necessary to apply a high temperature over the entire height of the column and this method therefore entails very heavy stress on the equipment, jeopardising the durability of the installation which potentially may generate contamination of the acid.

The objective of the invention is therefore to overcome the shortcomings of the state of the art by providing a method to solve this problem, such as first indicated and which comprises:

a) burning a fuel in the presence of combustion air in a so-called combustion chamber, in an upper part thereof, to form a flame and combustion gases, b) spraying a spray fluid comprising substantially pure orthophosphoric acid, c) polymerization-condensation of the said pure orthophosphoric acid to form a polyphosphoric acid in the form of an acid mist accompanied by formation of gases which mix with the combustion gases to reach a predetermined temperature, the said mixture causing sudden lowering of the temperature of the combustion gases, d) separating the said polyphosphoric acid mist from the said mixture of gases, e) collecting the said polyphosphoric acid thus formed at the bottom of the said combustion chamber, in a vessel, and f) outputting the said gas mixture via a lower part of the said combustion chamber that is separate from the said collecting of polyphosphoric acid.

By the term << upper part >> of the combustion chamber is meant the headspace and the upper side parts of the combustion chamber. The flame produced in the combustion chamber is therefore orientated downwards or sideways. Also by << formation of a flame >> it is evidently meant that this may possibly comprise the formation of several flames by several burners located in an upper part of the combustion chamber, for example all positioned laterally.

As can be ascertained, in the method of the invention the flame initially produced by the burner (at the combustion step) may reach a temperature of about 1700° C. When the spray fluid comprising orthophosphoric acid is sprayed into the said flame, the temperature of the flame is then reduced to a maximum temperature of 650° C., a temperature which must be maintained to obtain polyphosphoric acids of high concentrations (87%). Therefore, it is the removal of dilution water followed by the polymerization-condensation step which removes the constituent water of the orthophosphoric acid, the result being a sudden lowering of the temperature of the combustion gases when mixed with the water-containing gases. The combustion gases initially at 1700° C. are suddenly cooled down to a maximum temperature of 650° C. and preferably between 350 and 650° C. in relation to the concentration of the polyphosphoric acid (76 to 87% $P_2O_5$). On this account, the equipment is subjected to less stress than in a counter-flow reactor. Evidently, when the quantity of orthophosphoric acid is determined in relation to the concentration of polyphosphoric acid it is desired to reach, and hence in relation to the predetermined temperature it is desired to reach, it is necessary to take into account the cooling of flame temperature which occurs at the time of spraying, even if the spraying contributes to a lesser extent towards this cooling.

In one advantageous embodiment of the invention, the said spray fluid comprising substantially pure orthophosphoric acid is sprayed into the said flame in the presence of a secondary fluid, in particular an inert gas, preferably nitrogen. The nitrogen thus added at the same time as the phosphoric acid allows optimal spraying of the acid into the combustion chamber, at burner height, without introducing any surplus oxygen which could oxidize the reactor materials on which large demand is already being placed.

Advantageously, during combustion, the quantity of combustion air is stoechiometric (air/natural gas ratio=10) in relation to the quantity of fuel, preferably natural gas, to obtain a maximum reduction in the oxygen content of the hot gases and to reduce energy losses. On this account, the flame obtained has a temperature close to 1700° C. and when the acid is injected followed by the polymerization-condensation reaction, the temperature is no more than 650° C.

In one advantageous embodiment, the method further comprises drawing-off the polyphosphoric acid which is collected in the said vessel, heat exchange allowing cooling of the drawn-off polyphosphoric acid and the feeding of cooled polyphosphoric acid to the said vessel. These steps therefore allow the obtaining of a recirculation loop having a strong flow of cooled polyphosphoric acid allowing a large reduction in the temperature of the produced phosphoric acid from a temperature of about 350 to 650° C. depending on $P_2O_5$ concentration down to a temperature of between 100 and 120° C. The temperature of the collected polyphosphoric acid must effectively be maintained at between 100° C. and 120° C. to ensure resistance of equipment and to prevent the polyphosphoric acid from settling in this part of the installation.

In one advantageous embodiment of the method according to the invention, the said feeding of cooled polyphosphoric acid also feeds a storage tank. Since this temperature is optimal firstly to ensure resistance of equipment and secondly to avoid settling of the polyphosphoric acid, it is at this point that it is advantageous to withdraw part of the produced polyphosphoric acid for storage thereof in a storage tank.

In one preferred embodiment, the said mixture of gases leaving the combustion chamber is depleted of $P_2O_5$ through controlled cooling to obtain additional recovery of polyphosphoric acid. Therefore, the said gas mixture leaving the combustion chamber and still containing $P_4O_{10}$ in the form of gas and fine droplets of polyphosphoric acid is subjected to controlled cooling which, whilst maintaining it at a temperature slightly higher than dew point, allows the $P_2O_5$ content thereof to be depleted by means of a suitable mechanical system. This allows additional recovery of polyphosphoric acid which can then be sent towards the vessel containing polyphosphoric acid extracted from the combustion chamber. In one advantageous embodiment of the method of the invention, the said gas mixture leaving the combustion chamber is scrubbed with a scrub solution and cooled to a temperature of between 35 and 50° C. and preferably of around 40° C. This scrubbing can be performed directly on the gas mixture on leaving the combustion chamber, or on the gas mixture which has been subjected to the said prior depletion step. At the time of scrubbing, soluble gaseous compounds such as fluorinated gases, SOx and the last entrained $P_2O_5$ are collected and entrained by the aqueous scrub solution in which they are dissolved. This aqueous phase is then collected in a collection vat and can be re-injected into the scrubbing tower to scrub hot gases and/or part thereof can be withdrawn for example to be used and/or recycled in other processes such as a process for producing orthophosphoric acid from a phosphate ore in which sulphuric acid is used. In this case it may be suitable to add water, firstly to allow the concentration of scrub solution to be returned to below saturation and secondly to reduce the temperature of the residual scrub solution. As a result, the gas mixture thus cooled normally only contains water vapour, nitrogen and $CO_2$ and can be discharged into the atmosphere.

In one variant of the invention, the hot gases of the said gas mixture leaving the combustion chamber are condensed indirectly, for example in an indirect condenser. This condensation can take place directly on the said gas mixture leaving the combustion chamber, or on the said gas mixture which has undergone the prior above-mentioned depletion step. The result of this indirect condensation is also to produce an aqueous acid solution containing fluorinated gases, SOx and the last entrained $P_2O_5$. The acidulated waters are then recovered, for example also at a step to produce phosphoric acid from phosphate ore. As a result, since the aqueous phase is recovered for other processing steps, the method of the invention does not release any liquid or gas containing undesirable compounds into the environment.

In another embodiment of the method according to the invention, the method further comprises the steps of:
  contacting the said gas mixture leaving the combustion chamber, optionally prior to said scrubbing or said condensation or optionally after the above-mentioned depletion, with the said orthophosphoric acid before it is sprayed into the said combustion chamber,
  heat exchange between the said orthophosphoric acid and the said gas mixture, and
  recovery of any droplets of the said polyphosphoric acid mist carried by the said gas mixture when it leaves the combustion chamber.

Therefore, the orthophosphoric acid to be polymerized would be used as first scrub liquid for the hot gases in a gas-acid contactor which firstly allows preheating of the acid to be polymerized through contact with the hot gases of the said gas mixture leaving the combustion chamber before it is sprayed into the flame, which provides energy savings and energy recovery from the hot gases, and secondly allows recovery of the droplets of polyphosphoric acid formed by polymerization in the combustion chamber, which may be have been entrained by the hot gases and which can therefore be re-injected into the said combustion chamber.

Evidently, the temperature of the hot gases leaving the gas-acid contactor cannot be lower than the dew point in the orthophosphoric acid otherwise part of the water removed in the combustion chamber and present in the hot gases of the said mixture would again be condensed.

The temperature of the orthophosphoric acid (possibly containing some polyphosphoric acid) when leaving the said gas-liquid contactor may reach a temperature of between 190 and 240° C. before spraying, preferably around 200° C.

Other embodiments of the method according to the invention are mentioned in the appended claims.

A further subject of the invention is a device for producing polyphosphoric acid comprising a combustion chamber having:

a burner in an upper part of the combustion chamber, a first input for a fuel, a second input for combustion air, both located in the upper part of the said combustion chamber, a supply of spray fluid arranged to lead the said spray towards the said burner, separating means to separate the said polyphosphoric acid produced in the said combustion chamber from a gas mixture also produced in the said combustion chamber and which entrains the said polyphosphoric acid, an output for the polyphosphoric acid, and an output for the said gas mixture.

In one advantageous embodiment, the said combustion chamber has an outer wall and inner wall in non-impregnated amorphous carbon, between which there circulates a neutral gas. Non-impregnated amorphous carbon has low thermal conductivity and allows operation with a wall temperature of 650° C. Since non-impregnated amorphous carbon has low thermal conductivity, the inner wall remains hot even when polymerization-condensation occurs. It is recalled that polymerization-condensation is accompanied by elimination of water which causes sudden lowering of the temperature of the hot gases (quenching of the hot gases). If the wall is in material having good thermal conductivity, the formation of colder areas would be observed which could cause re-condensation of the water vapour contained in the hot gases. Therefore, the wall in non-impregnated amorphous carbon avoids cold points. However, a counter-pressure of nitrogen or other neutral gas is advantageous to prevent diffusion of the produced phosphoric or polyphosphoric acid within the porosity of the carbon. This nitrogen counter-pressure acts as barrier and the nitrogen diffusing through the inner open porosity of the wall protects the wall against any oxidants present in the said mixture of hot gases.

In another embodiment, the combustion chamber comprises walls in silicon carbide. In addition and advantageously, the combustion chamber comprises an inner wall and an outer wall both in silicon carbide. Between each wall the hot gases of the said gas mixture leaving the combustion chamber can then circulate from bottom upwards, outside the combustion chamber before leaving the reactor. Therefore the hot gases exchange their residual heat with the inner wall of the combustion chamber to avoid the formation of any cold points. Additionally, this embodiment avoids the constraint of having to operate under a neutral gas since it is no longer necessary to operate in the presence of graphite and the risks of ignition are therefore reduced. Although the hot gases in the jacket maintain the temperature in the combustion chamber, it is possible that these may condense when transferring their heat to the combustion chamber. In this case, suitable means for collecting condensates are also provided and they can be used to re-inject the condensates either into the collection vessel or towards the burner depending on the quality of these condensates.

In one variant, the said separating means comprise a static device located in the lower part of the combustion chamber, formed for example of a combustion chamber section in a lower part that is larger allowing loss of velocity of the combustion gases or hot gases. Therefore, by means of this loss of velocity, the gases effect a rotational movement before being directed by a deflector towards the hot gas output of the combustion chamber, whilst the small vesicles or droplets (density=2) of polyphosphoric acid are entrained under gravity towards the polyphosphoric acid output following a uniform trajectory.

In one variant according to the invention, the device further comprises a vessel for collecting polyphosphoric acid connected to the said polyphosphoric acid output and having drawing-off tubing connected to a heat exchanger, the said heat exchanger then being connected to a tank for storing polyphosphoric acid and/or to tubing for the recycling of polyphosphoric acid which is returned to the said collector vessel.

As already mentioned in the foregoing, this device allows a recirculation loop to be obtained comprising a heat exchanger. This recirculation loop is provided to control the temperature of the acid in the vessel which must be maintained at between 100 and 120° C. to ensure resistance of the equipment and to avoid settling of the polyphosphoric acid inside this installation. It is recalled that the polyphosphoric acid produced is collected at a temperature of between 350 and 650° C. (depending on the desired concentration of polyphosphoric acid). The percentage recycling of cooled acid compared with the produced acid must be high (by a factor of about 20) which causes major mixing accompanied by adequate cooling to reach the temperature of 100 to 120° C.

In one advantageous embodiment of the device according to the invention, the said output of the mixture of hot gases is directly or indirectly connected to a scrubbing tower.

In one variant according to the invention, the device further comprises an indirect condenser connected directly or indirectly to the said output of hot gases.

Irrespective of the scrubbing tower or indirect condenser, these devices allow the recovery of acid compounds or compounds harmful for the environment in an aqueous scrub solution or aqueous phase derived from condensation, which can then subsequently be used for other related processes such as the production of phosphoric acid from phosphate ore for example which uses sulphuric acid and frequently comprises fluorinated compounds.

In one advantageous variant of the invention, means are provided for controlled cooling of the hot gases, connected to the said output of hot gases from the combustion chamber. This therefore allows controlled cooling of the hot gases in the gas mixture leaving the combustion chamber, so that it is possible to collect additional polyphosphoric acid before the hot gases pass into the scrubbing tower, condensation or other unit, or any combinations thereof.

In another advantageous embodiment, the device according to the invention further comprises a gas-acid contactor having, in its lower part, an input for the hot gas mixture connected to the said output for the said hot gas mixture from the combustion chamber, optionally after the said controlled cooling means, and in its upper part an output for the hot gas mixture optionally connected to the said scrubbing tower or to the said indirect condenser when provided, a phosphoric acid input in the said upper part of the said contactor, and an output for orthophosphoric acid possibly containing some polyphosphoric acid entrained by the said orthophosphoric acid in counter-flow to the said gas mixture in the said lower part.

As also previously mentioned, the gas-liquid contactor allows recovery of the heat from the hot gases of the said gas mixture, for preheating the orthophosphoric acid before it enters the combustion chamber, and allows the collection of any acid droplets which may have been entrained by the said hot gas mixture so that they can be returned to the combustion chamber at the same time as the orthophosphoric acid.

It is understood that the temperature of the hot gases of the said mixture leaving the gas-acid contactor cannot be lower than the dew point in the orthophosphoric acid (otherwise the vaporised water would be re-condensed during polymerization).

In one advantageous embodiment, the said gas-acid contactor further comprises a filler material through which the orthophosphoric acid percolates and which is arranged on a perforated support or similar.

In one variant, the said gas-acid contactor comprises a gas diffuser which has a substantially gas-permeable upper part and a substantially liquid-permeable lower part, and optionally a demister in its upper part.

In another embodiment, the said orthophosphoric acid output of the said gas-acid contactor is connected to the said supply of spray fluid to the said combustion chamber.

In one variant, the device of the invention also comprises a storage tank for orthophosphoric acid, connected via tubing either to the said gas-acid contactor or to the said supply of spray fluid to the said combustion chamber.

Other embodiments of the device according to the invention are mentioned in the appended claims.

Other characteristics, details and advantages of the invention will become apparent from the description below that is non-limiting and given with reference to the appended figures.

Figure 1:
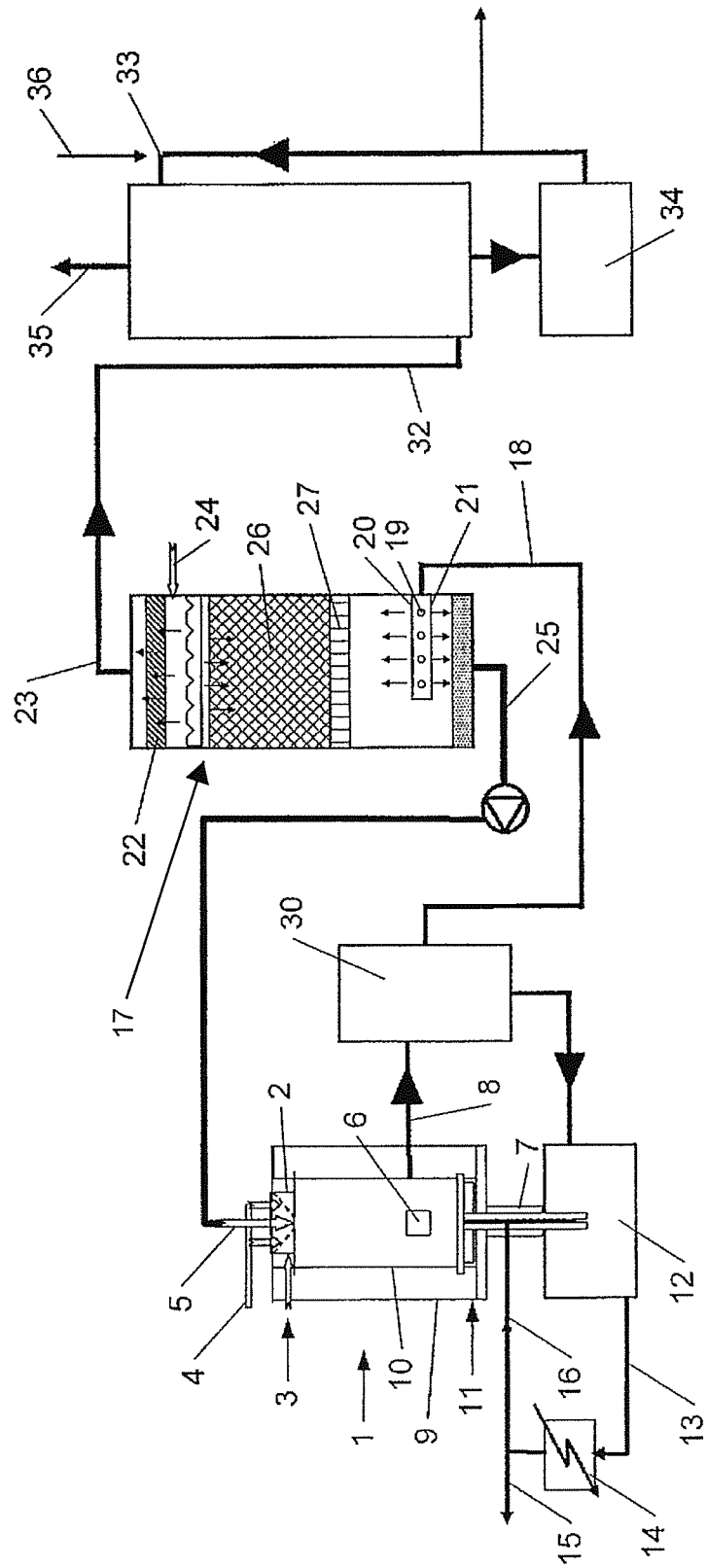
FIG. 1 is a flow diagram of a pilot unit comprising a combustion chamber and a gas-acid contactor collector.

The method according to the invention is implemented for example in a device such as illustrated comprising a combustion chamber 1 which comprises a burner 2, a first input 3 for a fuel such as natural gas for example, a second input 4 for combustion air. The said burner 2 fed with the said fuel and said combustion air, preferably in stoechiometric quantity, allows the generation of a flame in this case oriented downwards at a temperature of up to 1700° C., and of combustion gases at substantially the same temperature. This temperature drops to 500-650° C. at the time of acid injection and the polymerization-condensation reaction. In this manner, the oxygen content of the combustion gases is optimally limited.

As can be seen, the first and second inputs are located in the upper part also called the headspace of the combustion chamber 1 or in substantially equivalent manner over the entire upper lateral part of the combustion chamber. The combustion chamber 1 also comprises a supply of spray fluid 5 which allows this fluid to be brought to the height of the flame to be sprayed. The spray fluid is composed inter alia of a mixture of orthophosphoric acid and optionally nitrogen for optimal spraying of the acid into the combustion chamber.

Evidently, other secondary fluids can be used such as any non-flammable neutral gas for example. When the spray fluid is sprayed into the flame, the polymerization-condensation reaction can take place since the phosphoric acid provides sufficient energy thereto.

The polymerization-condensation reaction of the orthophosphoric acid to polyphosphoric acid therefore occurs at a temperature higher than 350° C., this formation being accompanied by instant removal of water (constituent and dilution water of phosphoric acid) in the form of vapour which mixes with the combustion gases and sprayed gaseous orthophosphoric acid (and with existing impurities). The removal of water causes sudden lowering of the temperature of the hot gases (combustion gases and gaseous acid) and hence quenching of the latter (due to the energy needed for the polymerization-condensation reaction). In addition, this sudden cooling of the gases in the mixture thus formed down to the predetermined target temperature allows the imposing of less severe operating stresses on equipment which considerably increases the lifetime of the installation.

The combustion chamber also comprises separating means 6 allowing the produced polyphosphoric acid to be separated from the hot gases of the gas mixture produced in the said combustion chamber.

The combustion chamber, as separating means, comprises a lower section for example that is larger and allows loss of velocity of the gases in the gas mixture thus produced. As a result, through the loss of velocity of these gases, they effect a rotational movement (of about 150 to 215°, preferably about 180°) whilst the small particles of polyphosphoric acid, which are in fact liquid vesicles of density about 2 consisting of formed polyphosphoric acid, are entrained downwardly under gravity towards the polyphosphoric acid output 7.

The gases which have performed a rotation are ejected via the output 8 for the hot gas mixture. As can be seen, the combustion chamber has an outer wall 9 and an inner wall 10 between which a neutral gas 11 is fed e.g. nitrogen. The inner wall is preferably in non-impregnated amorphous carbon having low thermal conductivity and is therefore a good insulator. The wall in amorphous carbon therefore remains hot, which avoids the onset of cold points which may re-condense the water removed at the polymerization-condensation step. Non-impregnated amorphous carbon allows operation under a wall temperature of about 650° C., and the injected nitrogen is advantageous to prevent the diffusion of phosphoric acid and/or polyphosphoric acid into the porosity of the carbon and to prevent the presence of hot oxygen on the carbon walls which could ignite.

Since the quantity of combustion air is stoechiometric with the quantity of fuel, and since the orthophosphoric acid is sprayed in the presence of nitrogen, the presence of oxidant is already maximally limited without being equal to 0 however. Therefore, it is advantageous to have this barrier of nitrogen to maintain the inner walls of the combustion chamber intact or almost intact.

The polyphosphoric acid output 7 leads into a collector vessel 12 for the polyphosphoric acid. The vessel has extraction tubing 13 connected to a heat exchanger 14 which itself is connected firstly to a storage tank 15 of polyphosphoric acid and secondly, in the illustrated embodiment, to tubing 16 for recycling of polyphosphoric acid returning to the collector vessel. This recirculation loop 13, 14, 16 is provided to control the temperature of the acid in the tank which must be maintained at between 100° C. and 120° C. to protect equipment and to prevent the polyphosphoric acid from settling in this part of the installation, this acid being collected at about 500-650° C. depending on the $P_2O_5$ concentration in the starting orthophosphoric acid. Mixing of a strong flow of produced polyphosphoric acid, previously cooled, is therefore required to obtain sudden lowering of the temperature of the polyphosphoric acid produced and collected at 500-650° C.

In this illustrated embodiment, the said output 8 for the hot gas mixture is connected to means 30 for controlled cooling which comprise a heat exchanger (not illustrated). This heat exchanger reduces the temperature of the hot gas mixture to a temperature slightly above the dew point of the gases in the polyphosphoric acid, to recover the polyphosphoric acid which would have been entrained by the gas mixture. The output for the hot gas mixture is also connected to a gas-acid contactor 17 which inter alia allows purification of the hot gases leaving the combustion chamber 1 before they are discharged into the atmosphere, and also allows recovery of part of their heat.

The gas-acid contactor 17, in a lower part thereof, comprises an input 18 for the hot gas mixture which is connected to the said output 8 for the hot gas mixture in the combustion chamber 1, and an output 23 for the hot gas mixture which is located in an upper part of the gas-acid contactor 17. Therefore, the hot gases of the gas mixture leaving the combustion chamber enter the gas acid contactor 17 and escape via an upward movement towards the hot gas output 23.

Advantageously the temperature of the hot gases leaving the gas-acid contactor 17 cannot be lower than the dew point in the orthophosphoric acid.

The gas-acid contactor 17 comprises a gas diffuser 19 which has an upper part 20 that is substantially gas-permeable and a lower part 21 that is substantially liquid-permeable. Therefore the hot gases pass through the upper part 20 whilst any liquid parts entrained by the hot gases leaving the combustion chamber remain confined in the gas diffuser and, subjected to gravity, they pass through the lower part 21. In addition, in its upper part, the gas-acid contactor 17 also comprises a demister 22 which allows the recovery of any droplets of liquid present in the gas before it exits via the hot gas output 23.

The gas-acid contactor 17 also comprises an orthophosphoric acid input 24 in an upper part, and a phosphoric acid output 25 (residual orthophosphoric and polyphosphoric acid) in a lower part. Therefore the orthophosphoric acid circulates from top downwards in the gas-acid contactor 17 firstly allowing preheating thereof by the hot gases which circulate from bottom upwards and secondly allowing the collection of any droplets of polyphosphoric acid initially formed in the combustion chamber 1 but which could have been entrained by the hot gases.

The gas-acid contactor 17 also comprises a filler material 26 through which the phosphoric acid percolates, fed by the orthophosphoric acid input 24, and arranged on a perforated support 27 e.g. a supporting grid. Preferably, the filler material 26 stores the heat derived from the hot gases. The phosphoric acid output 25 of the gas-acid contactor 17 is connected to the said supply of spray fluid 5 for the combustion chamber 1. Therefore, the phosphoric acid entering the combustion chamber via the spray fluid is preheated by the hot gases to a temperature of between 190 and 240° C., preferably about 200° C.

In one particularly advantageous embodiment, the phosphoric acid—before entering the gas-acid contactor 17—originates from a storage tank of phosphoric acid connected by tubing to the gas-acid contactor 17.

In the illustrated embodiment, the hot gases of the gas mixture escape from the gas-acid contactor 17 via the output 23 which is connected to a scrubbing tower 31 by an input 32 for hot gases or the mixture of hot gases located in a lower part thereof. As can be seen, the scrubbing tower 31 is supplied with scrub solution at different points thereof 33a, 33b, 33c. This scrub solution allows the entraining of contaminants present in the hot gases, such as gaseous SOx or fluorinated compounds for example. These latter gaseous contaminants are then dissolved in the aqueous scrub solution and form the scrub solution before being collected in a collector tank 34. The collector tank 34 re-supplies the scrubbing tower 31 via a closed circuit. As a result, the gases escaping into the atmosphere via the output 35 are free or almost free of harmful contaminants for the environment.

If part of the scrub solution is drawn off, or if the concentration of acid compounds or the temperature is too high, an addition of water will regularise the situation by causing inter alia a dilution effect The tank 34 also comprises an output 36 for the scrub solution (slightly acidified). This acidified scrub solution can then be used for other processes such as the extraction of phosphoric acid from phosphate ore for example, since this acidified aqueous scrub solution is chiefly composed of sulphuric acid and fluorinated compounds.

It therefore clearly follows that the device and method of the invention cause particularly low pollution. The cold points are avoided inasmuch as possible, to prevent condensation and the adding of water to the polyphosphoric acid in the combustion chamber, through the presence of walls in non-impregnated amorphous carbon which have low thermal conductivity. Therefore, instead of losing the energy of these hot gases or releasing very hot gases into the atmosphere, the device of invention clearly allows this energy to be recovered for preheating of the phosphoric acid before it enters the combustion chamber, thereby reducing the consumption of the burner 2.

In addition, through the presence of the gas-acid contactor 17, the demister 22 and the gas diffuser 19 there is practically no loss of produced polyphosphoric acid, since everything which can be recovered from the hot gases is collected by the phosphoric acid percolating through the gas-acid contactor from top downwards.

In one very large-scale embodiment for example, the scrubbing tower can be replaced by an indirect condenser which allows the same results to be obtained but with a higher yield in terms of reduced emission of pollutants.

Figure 2:
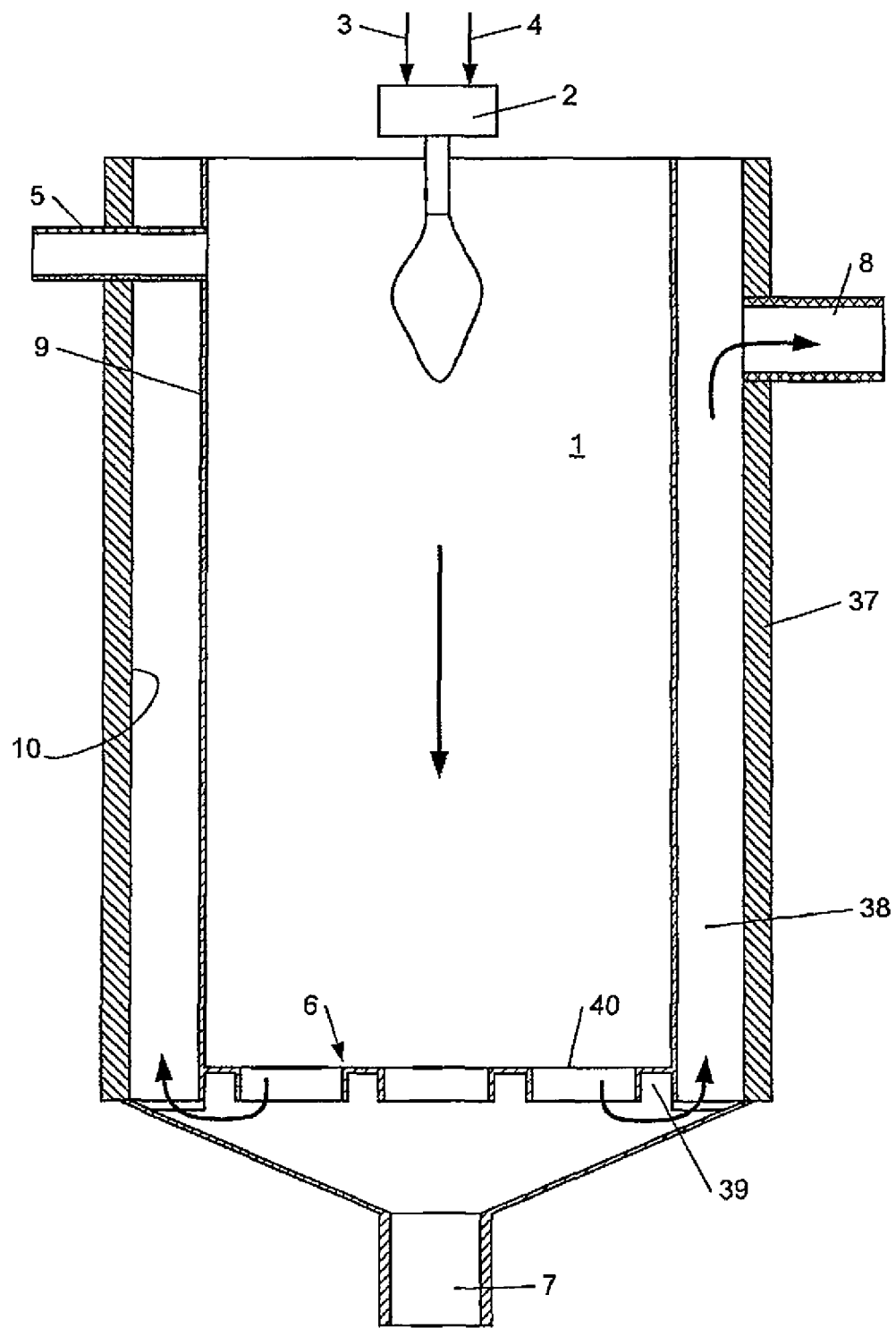
FIG. 2 is a flow diagram of another combustion chamber according to the invention.

As can be seen in FIG. 2, another type of combustion chamber can be used in the installation given as an example in FIG. 1. The illustrated combustion chamber 1 therefore comprises a burner 2, a first input 3 for fuel and a second input 4 for combustion air. The combustion chamber 1 also comprises a supply of spray fluid 5 which allows this fluid to be led to the height of the flame for spraying. The spray fluid is composed, inter alia, of a mixture of substantially pure orthophosphoric acid and optionally nitrogen for optimal spraying of the acid into the combustion chamber.

The combustion chamber 1 comprises an inner wall 9, preferably in silicon carbide, and an outer wall 10 also in silicon carbide coated with a protective insulating layer 37. The inner 9 and outer 10 walls define a jacket between them in which the hot gases of the gas mixture are able to circulate to heat the combustion chamber 1 and thereby avoid cold points which are harmful as mentioned previously.

The combustion chamber also comprise separating means 6 allowing the produced polyphosphoric acid to be separated from the hot gases of the gas mixture also produced in the said combustion chamber and which entrain the said polyphosphoric acid. In this embodiment, the separating means are in the form of a bottom part 6 of the combustion chamber pierced with orifices 40. The bottom part 6 of the combustion chamber pierced with orifices 40 rests on seating 39. The hot gases entrain the said polyphosphoric acid through the orifices 40 and are deflected on the lower wall of the combustion chamber. They then move up into the jacket 38 before leaving via the hot gas output 8 located this time in an upper part of the combustion chamber 1, whilst the formed and thus entrained polyphosphoric acid mainly leaves the combustion chamber 1 under gravity via the polyphosphoric acid output 7 at the bottom of the combustion chamber 1. Evidently, the hot gases of the above-mentioned mixture also entrain part of the produced polyphosphoric acid into the jacket 38, but as mentioned previously the device of the invention comprises various suitable means allowing recovery thereof to obtain a significant increase in the global production yield of the installation according to the invention. It is recalled that the small particles of polyphosphoric acid produced are in fact liquid vesicles having a density of about 2 and consisting of formed polyphosphoric acid, and that these are entrained downwards under gravity towards the polyphosphoric acid output 7.

Those gases which have effected a rotation are ejected via the hot gas output 8.

The present invention is evidently not in any way limited to the embodiments described in the foregoing, and many modifications can be made thereto without departing from the scope of the appended claims.

The invention claimed is:

1. Method for producing polyphosphoric acid from pure solutions of orthophosphoric acid, comprising:
   a) burning a fuel in a burner in the presence of combustion air in a combustion chamber having an upper part and a lower part, wherein the fuel is burned in the upper part of the combustion chamber to form a flame and combustion gases,
   b) spraying a spray fluid comprising pure orthophosphoric acid, towards the said burner into the said flame in the upper part of the combustion chamber, while simultaneously polymerizing-condensing the said pure orthophosphoric acid to form a polyphosphoric acid in the form of an acid mist accompanied by formation of gases which mix with the combustion gases to form a mixture causing sudden lowering of the temperature of the combustion gases,
   c) separating the said polyphosphoric acid mist from the said mixture to form a gas mixture,
   d) collecting the said polyphosphoric acid thus formed at the bottom of the said combustion chamber, in a vessel and
   e) outputting the said gas mixture via the lower part of the said combustion chamber that is separate from the said collecting of polyphosphoric acid.

2. The method according to claim 1, wherein the said spray fluid comprising pure orthophosphoric acid is sprayed into the said flame in the presence of a secondary fluid.

3. The method according to claim 1, wherein, during the said combustion, the quantity of combustion air is stoechiometric relative to the quantity of fuel.

4. The method according to claim 1, further comprising drawing-off the collected polyphosphoric acid, a heat exchanger allowing cooling of the polyphosphoric acid thus drawn off and feeding of the said vessel with cooled polyphosphoric acid.

5. The method according to claim 4, wherein the said feeding of cooled polyphosphoric acid also feeds a storage tank.

6. The method according to claim 1, wherein the said gas mixture leaving the combustion chamber is depleted of $P_2O_5$ through controlled cooling for additional recovery of polyphosphoric acid.

7. The method according to claim 1, wherein the said gas mixture leaving the combustion chamber, optionally depleted of $P_2O_5$, is scrubbed with an aqueous scrub solution and cooled to a temperature of between 35 and 50° C.

8. The method according to claim 1, wherein the said gas mixture leaving the combustion chamber, optionally depleted of $P_2O_5$, is condensed via indirect process.

9. The method according to claim 1, further comprising:
   contacting the said gas mixture leaving the combustion chamber with the said orthophosphoric acid before it is sprayed into the said combustion chamber,
   heat exchange between the said orthophosphoric acid and the said gas mixture, and
   recovering any droplets of the said polyphosphoric acid mist entrained by the said gas mixture when it leaves the combustion chamber.

10. The method according to claim 1, wherein the orthophosphoric acid has a temperature of between 190 and 240° C. before spraying.

11. The method according to claim 2, wherein the secondary fluid is an inert gas.

12. The method according to claim 11, wherein the inert gas is nitrogen.

13. The method according to claim 10, wherein the temperature of orthophosphoric acid is about 200° C.

14. The method according to claim 9, wherein the contacting step is performed prior to said polymerization-condensation.

15. The method according to claim 9, wherein the said gas mixture leaving the combustion chamber is scrubbed with an aqueous scrub solution and cooled to a temperature of between 35 and 50° C., and wherein the contacting step is performed prior to said scrubbing.

16. The method according to claim 9, wherein the said gas mixture leaving the combustion chamber is depleted of $P_2O_5$ through controlled cooling for additional recovery of polyphosphoric acid, and wherein the contacting step is performed after said depletion.

* * * * *